United States Patent [19]

Melcharick

[11] 3,972,297
[45] Aug. 3, 1976

[54] SEWING MACHINE POSITION AND SPEED SENSING SYSTEM

[75] Inventor: Juergen Melcharick, Bissingen, Germany

[73] Assignee: Union Special Corporation, Chicago, Ill.

[22] Filed: Jan. 27, 1975

[21] Appl. No.: 544,443

[30] Foreign Application Priority Data
Jan. 30, 1974   Germany.............................. 2404346

[52] U.S. Cl............................................. 112/219 A
[51] Int. Cl.²......................................... D05B 69/22
[58] Field of Search............... 112/219 A, 220, 221, 112/67, 87; 308/467, 369, 372

[56] References Cited
UNITED STATES PATENTS

| | | | |
|---|---|---|---|
| 3,761,790 | 9/1973 | Daab............................... | 112/219 A |
| 3,815,531 | 6/1974 | Wurst et al...................... | 112/219 A |
| 3,881,435 | 5/1975 | Makabe........................... | 112/219 A |

*Primary Examiner*—H. Hampton Hunter
*Attorney, Agent, or Firm*—John A. Schaerli

[57] ABSTRACT

Logic circuit device and frequency voltage converter connected to the impulse preparation device. A gate being interposed between voltage converter and the impulse preparation device. Comparator connected to the converter which compares its output to an adjustable reference voltage.

2 Claims, 4 Drawing Figures

SEWING MACHINE POSITION AND SPEED SENSING SYSTEM

BACKGROUND OF THE INVENTION

The disclosure relates to an angular position and speed dependent sensing system, particularly for sewing machines, utilizing multiple impulse transmitter means securely fastened to the main shaft of the sewing machine which is to be controlled.

Angular position and speed dependent sensing systems are well known from prior art. They are widely used especially in sewing machines in order to stop the needle in a predetermined position and to control other movements of the sewing machine. Examples of this would be cutting of the thread or lifting of the presser foot.

Among these known sensing systems some employ impulse transmitter means which release certain functions, i.e., positioning of the needle or thread cutters. Because these operations are releasable only at a predetermined speed, a tachometer generator is needed. The tachometer generator indicates the predetermined speed via a comparator.

These previously known control systems are relatively expensive, because the angle positioning device and the tachometer generator are two separate structures with only the outlet connecting both units. It has been proposed to combine the impulse transmitter means and the tachometer generator means into one unit thus measure revolutions; however, this has had no great influence on the relatively high cost of the above mentioned control system.

SUMMARY OF THE INVENTION

In accordance with the invention, a sensing system for a sewing machine is provided comprising a multiple impulse transmitter means being constructed with missing individual poles which are arranged at identical angular distances. By having missing individual poles it makes possible an angle dependent delivery of impulses without exerting any detrimental influence on the tachometer circuit. Associated with the multiple impulse transmitter means is a Hall generator means which senses the polarity of the impulses given off by the multiple impulse transmitter. A multiple impulse generator means is used both for generating a signal in a predetermined angular position and for producing a voltage which is amplified by a frequency voltage converter and then transmitted to comparator means. By this construction two functions are sensed in a simple manner by one single output.

It is therefore a object of the invention to provide a sensing system for a sewing machine in which an impulse evaluator, comprised of a circuit for the preparation of an impulse followed by a logic circuit works in conjunction with the Hall Generator to sense the position of the main shaft on the said sewing machine.

It is another object of the invention to provide a sensing system for a sewing machine wherein the output of the impulse preparation means is so linked with the input of the frequency—voltage converter means that a DC voltage is produced at the output of the frequency voltage converter quadrupling the number of poles per unit of time. Comparison of this value with another preset voltage value thus controls the speed of the sewing machine.

My invention will be better understood from the following description taken in connection with the accompanying drawings and its scope will be pointed out in the appended claims.

Figure 1:
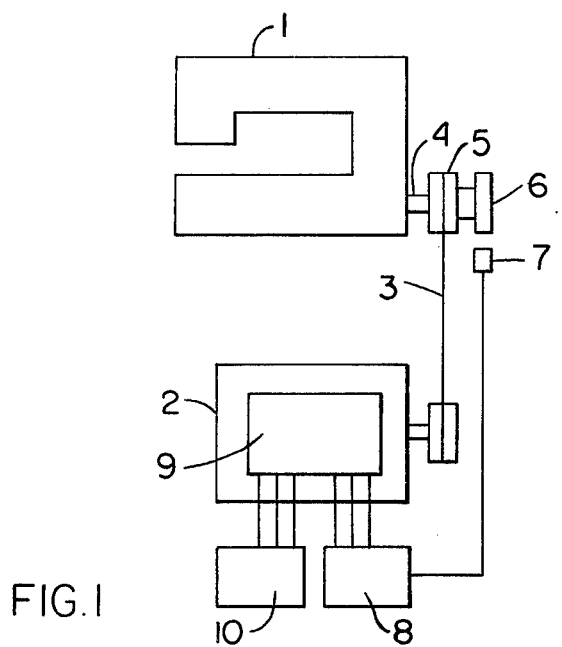
FIG. 1 is a schematic diagram showing the sensing system in connection with a sewing machine.

With reference to FIG. 1, it will be seen that there has been schematically illustrated a conventional sewing machine 1, which is driven in the customary manner by drive belt means 3, which may be a V-belt, connecting belt pulley means 5 with belt pulley means carried on the transmitter 2. In the preferred embodiment, a multiple impulse transmitter means is securely fastened to the main shaft 4. The preferred embodiment of the multiple impulse transmitter is such that two missing poles are adjustable at a distance in relation to each other according to the distance of the poles. The multiple impulse transmitter means 6 coacts with Hall generator means 7. Hall generator means 7 transmits the impulses generated by the multiple impulse transmitter means 6 into switch cabinet means 8 preferably forming one unit with a control cabinet means 9 mounted on the transmitter 2. Control pedal means 10 is connected with switch box means 9 as an additional control member.

Figure 2:
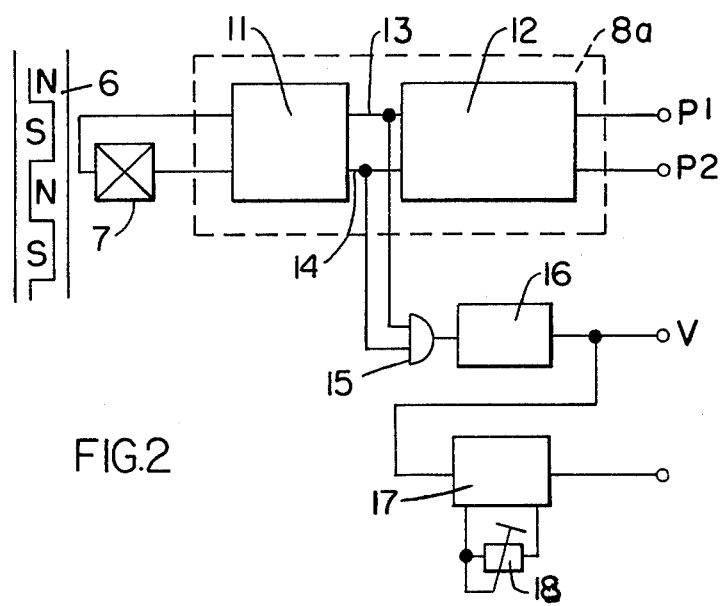
FIG. 2 shows a principal circuit diagram of the sensing system.

According to the principal circuit diagram shown in FIG. 2 an impulse evaluator 8a is arranged in the switch cabinet means 8. The impulse evaluator means 8a consists of impulse preparation means 11 coupled with logic circuit means 12, via conduit means 13, 14 the results of which are signals produced at either positions P1 and P2 whereby controlling the position of the sewing machine.

Conduit means 13, 14 of the impulse preparation means 11 are connected with a logic circuit means 12 as mentioned above but the impulse preparation means 11 is also connected to a gate 15 which is connected to frequency voltage converter means 16. The frequency voltage converter means 16 generates in a known manner a DC voltage at the outlet V, which corresponds to four times the number of poles per unit of time. Comparator means 17 compares the voltage coming from the frequency voltage converter means 16 with a preset reference voltage adjustable by a rheostat 18, whereby sensing the speed of the sewing machine.

Figure 3:
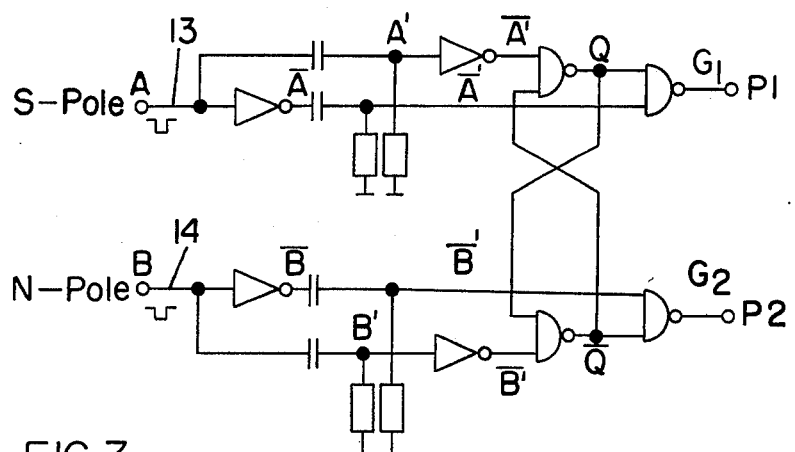
FIG. 3 shows the logic circuit for setting the signal from the impulse sequence.

Referring now to FIG. 3, the impulse preparation means 11 forms for each north pole signal and for each south pole signal received from the multiple impulse transmitter means 6 a negative impulse. The impulses resulting from the impulse preparation means are then differentiated and inverted or inverted and then differentiated.

Figure 4:
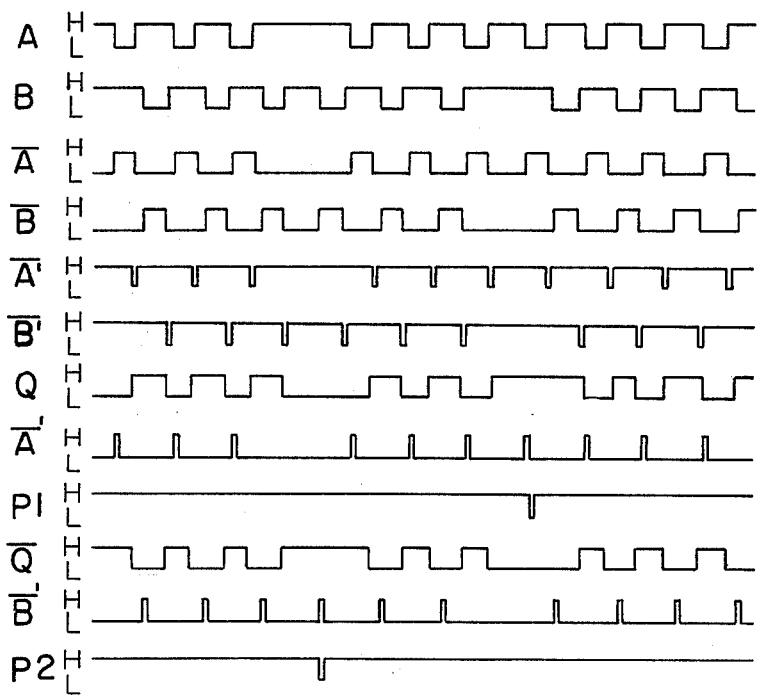
FIG. 4 shows an impulse diagram of the logic circuit.

As can be seen in FIG. 4, the impulse A of the south pole is differentiated and inverted to create impulses shown in A' and A'. Schematic representation of A' would be the inverse of A'. The impulse A is also inverted creating an impulse schematically shown as A and then differentiated to give a schematic resultant shown as A . The north pole impulse B is inverted to cause an impulse B which is then differentiated to cause an impulse schematically shown as B . The north pole impulse B is also differentiated with a schematic resultant shown as B' which is the inverse of the impulse as shown as B'. The signals A' and B' set an R-S Flip Flop, with Q and Q being placed at their outputs.

As long as alternating impulses A and B are generated by the multiple impulse transmitter means 6, Gates G-1 and G-2 are blocked from receiving either or both signals A and B . However, if one pole is missing in the multiple impulse generator, so that two identical poles follow each other, the R-S Flip Flop remains for one period in the position into which the last pole ahead of the missing pole had caused it to flip. In that way the corresponding gate, it being either Gate 1 or Gate 2, will be open for the next impulse A and/or B of the pole following the gap. A negative signal is then received at either P1 or P2. The signal released at either P1 or P2 trigger at a predetermined number of revolutions and the signal released at P1 or P2 work in conjunction with the corresponding position of the pedal 10 in a known manner to sense if the sewing machine is in the preferred position.

Thus, it is apparent that there has been provided, in accordance with the invention, an angular position and speed dependent control system that fully satisfies the objects and aims set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:
1. A device for sensing the speed and angular position of a sewing machine main shaft comprising:
   multiple impulse transmitter means mounted on said shaft for rotation therewith and including a series of circumferentially spaced poles, transmitting a series of impulses during one revolution thereof and at least one non-polarized area means producing more than one successively identical impulse relative to a predetermined angular position of said shaft;
   Hall generator means associating with said multiple impulse transmitter means for determining polarities of said impulses;
   impulse preparation means for receiving impulses from said Hall generator means;
   logic circuitry means connected with said impulse preparation means for receiving impulses therefrom and for generating a signal at the angular position of said shaft when more than one successively identical impulse is produced whereby sensing the position of said shaft;
   gate means connected to and receiving output from said impulse preparation means;
   frequency voltage converter means receiving output from said gate means and producing a voltage which is proportional to the number of impulses produced per unit of time; and
   comparator means receiving current from said frequency voltage converter means comparing said voltage with a preset voltage whereby sensing the speed of said shaft.

2. A device for sensing angular position of a sewing machine main shaft comprising:
   multiple impulse transmitter means mounted on said shaft for rotation therewith and including a series of circumferentially spaced poles, transmitting a series of impulses during one revolution thereof and at least one non-polarized area means producing more than one successively identical impulses relative to a predetermined angular position of said shaft;
   Hall generator means associating with said multiple impulse transmitter means for determining polarities of said impulses;
   impulse preparation means for receiving impulses from said Hall generator means; and
   logic circuitry means connected with said impulse preparation means for receiving impulses therefrom and for generating a signal at the angular position of said shaft when more than one successively identical impulse is produced whereby sensing the position of said shaft.

* * * * *

UNITED STATES PATENT AND TRADEMARK OFFICE
CERTIFICATE OF CORRECTION

PATENT NO. : 3,972,297
DATED : August 3, 1976
INVENTOR(S) : Juergen Melcharick

It is certified that error appears in the above-identified patent and that said Letters Patent are hereby corrected as shown below:

In the identifying data - (73)

ASSIGNEE: Change "Union Special Corporation, Chicago, Ill." to --Union Special Maschinenfabrik G.m.b.H., Stuttgart, Germany.--

Signed and Sealed this

Twenty-sixth Day of October 1976

[SEAL]

Attest:

RUTH C. MASON
*Attesting Officer*

C. MARSHALL DANN
*Commissioner of Patents and Trademarks*